(12) United States Patent  (10) Patent No.: US 8,145,063 B2
Poppe  (45) Date of Patent: Mar. 27, 2012

(54) METHOD AND DEVICE FOR READJUSTING A POLARIZATION DRIFT

(75) Inventor: Andreas Poppe, Perchtoldsdorf (AT)

(73) Assignee: Austrian Research Centers GmbH - ARC, Vienna (AT)

( * ) Notice: Subject to any disclaimer, the term of this patent is extended or adjusted under 35 U.S.C. 154(b) by 764 days.

(21) Appl. No.: 12/137,005

(22) Filed: Jun. 11, 2008

(65) Prior Publication Data

US 2008/0310856 A1 Dec. 18, 2008

(30) Foreign Application Priority Data

Jun. 15, 2007 (AT) ................................. A 933/2007

(51) Int. Cl.
*H04B 10/00* (2006.01)
(52) U.S. Cl. .................. 398/152; 398/141; 359/483.01; 359/485.01
(58) Field of Classification Search .................. 398/152, 398/115, 141, 45; 359/483, 484, 488, 494, 359/497, 483.01, 485.01, 487.05, 489.07, 359/489.08, 490.02
See application file for complete search history.

(56) References Cited

FOREIGN PATENT DOCUMENTS

| DE | 603 02 786 | 7/2006 |
|---|---|---|
| WO | WO 03/077449 | 9/2003 |

OTHER PUBLICATIONS

Peng et al. ("Experimental Long-Distance Decoy-State Quantum Key Distribution Based on Polarization Encoding"), Physical Review Letters, 98(1)/010505, 2007.*
Austrian Office Action issued in Austrian Application No. A 933/2007, mailed Dec. 10, 2007.
Peng et al., "Experimental long-distance decoy-state quantum key distribution based on polarization encoding," *Phys Rev Lett.*, 98(1):010505, 2007.

* cited by examiner

*Primary Examiner* — M. R. Sedighian

(74) *Attorney, Agent, or Firm* — Fulbright & Jaworski L.L.P.

(57) ABSTRACT

For readjusting a polarization drift in the transmission of a polarization-encoded optical signal from a transmitter via a light guide to a receiver, optical auxiliary signals having the same wavelength as the polarization-encoded signal as well as different polarizations as in correspondence with a first base and a second base are fed into the light guide on the side of the transmitter while the transmission of the polarization-encoded signal is interrupted, and the optical auxiliary signals are picked up from the light guide and checked for shifts of the different polarizations by a polariometer on the side of the receiver, whereupon, in the event of the detection of polarization shifts, the different polarizations shifted during the transmission are displaced in the sense of the polarization set values via a polarization controller associated with the light guide.

20 Claims, 3 Drawing Sheets

METHOD AND DEVICE FOR READJUSTING A POLARIZATION DRIFT

BACKGROUND OF THE INVENTION

1. Field of the Invention

The invention, in general, relates to the readjustment of the polarization drift caused by optical fibers, e.g. for polarization-encoded q-bits.

The invention, in detail, relates to a method and a device for the adjustment control of a polarization drift in the transmission of a polarization-encoded optical signal from a transmitter via an optical waveguide to a receiver.

2. Description of Related Art

Polarization is used only to a limited extent for classic optical communication, because this property of light is strongly influenced in optical fibers (light guides, optical waveguides). Because of very small deviations of the normally round fiber geometry, double refraction with a rapid axis and a slow axis is formed, which causes the light with the respective polarizations to be transported differently rapidly. The respective axis indicates the direction of the electric field vector and is always oriented perpendicularly to the direction of propagation. The positions of the axes within the fiber are undefined in the sense that both the rapid and the slow axes may point in any direction, yet both axes will always extend perpendicularly to each other.

If polarized light is incoupled exactly in the axial direction of a fiber, it will typically retain its polarization over hundreds of meters until the axes will slightly drift in their positions. The starting positions of the axes are, however, unknown. The luminous power is split onto the slow and the rapid axes as a function of the coupling angle and will loose its original position within a few centimeters of the propagation distance: If the different propagation speed causes the divergence of the wave packs already by portions of the wavelength, the wave packs will still be able to superpose, yet a different polarization will adjust. The result of such a change in polarization is that the polarization will no longer be predictable within the shortest fiber paths. In addition, this drift is strongly dependent on the mechanical pressure exerted on glass fibers and, naturally, will thus also depend on time and temperature.

Despite these circumstances, it is possible in conventional transmission technology to virtually double the capacity in glass fibers by the aid of polarization. The information transmitted in one of the bases is independent of the information of the other base, and in this scheme it is made sure that the two bases will not interfere with each other. In doing so, two identical optical laser diodes (having equal radiation wavelengths) are modulated with the information of two transmission channels, the only difference chosen being that the respective polarizations are perpendicular to each other. Using already commercially available devices for readjustment (cf.: http://www.thorlabs.com/thorProduct.cfm?partNumber=PL100S www.bfioptilas.de; http://www.generalphotonics.com/PolaStay.htm), it can be ensured that a polarization radiated into a base (e.g. horizontally or vertically) will still be received in that polarization at the receiver. The second channel would automatically be in a polarization rotated by 90°.

A polarization-encoded, classic transmission system is conceivable, in which a bit value, e.g. "0", is to be assigned to a horizontal radiation and the other bit value, e.g. "1", is to be assigned to a vertical radiation. In a manner similar to the two independent information channels mentioned above, the readjustment of the polarization would have to be used in order that a transmitted bit value would have the same meaning to both the transmitter and the receiver. Such an encoding is avoided in practice, because the discrimination between high/low amplitudes or different phases is transmitted to a reference signal in a much more interference-free manner.

By contrast, it would be readily feasible to utilize such an encoding in quantum technology. The generation and measurement of the quantum information encoded with a polarization is a routine procedure already well controllable, and for this reason polarization-encoded quantum bits (q-bits) are highly attractive for quantum applications like quantum cryptography (QKD for "quantum key distribution"). The technique presented here, in particular, deals with the question of the distribution and stabilization of polarization-encoded photons to enable the reading of the information transmitted via an optical cable also at the receiver, but is not limited thereto and, above all, not to the application for telecommunication wavelengths in the wavelength band of about 1310 nm or 1550 nm, although it is of particular advantage in this field.

In a typical arrangement used in quantum communication, it is mostly photons which are chosen to be used as individual information carriers. They exhibit the least interaction with the carrier medium (e.g. glass fiber or air in free-space propagation) and retain their polarization and, hence, the stored information over long distances. The quantum channel is located between the generation (preparation), on the one hand, and the measurement, on the other hand. If this channel is completely or partially comprised of optical glass fibers, a strong transformation of polarization will have to be expected in the same. Yet, this can be reversed again as long as no depolarization is caused by polarization mode dispersion or any other effect. As long as this does not happen, the technique presented here is able to restore the original state. This is exactly what is essential therefor, namely that all of the polarization states at the input be imaged to the output as precisely as possible:

As opposed to binary, conventional bit values (comparable with a light switch), the encoding of information in quantum technology is effected by q-bits. These constitute a superposition of two states. It can be readily accomplished through polarization. Like with the above-mentioned, but not used polarization-encoded, classic method, one photon has two polarization states that can be produced. In addition, a superposition of the states is also of particular importance. This constitutes an essential difference to the classic type of information processing, because the superposition of states will only make sense in quantum technology.

Needless to say that in quantum communication it is, in particular, to be taken care that both the states and this superposition be transported in an errorless manner. This cannot be achieved by the above-mentioned commercial systems, because there the field of application was the maintenance of a base, e.g. the (H,V) base (horizontal/vertical polarization). By contrast, quantum technology requires an automatic control also controlling a second base with sufficiently high accuracy. In this respect, it is possible to use the second base with linearly polarized light, the (+/−)-base (linearly +45°/−45° polarized) or the circularly oriented (L/R)-base (left/right hand circularly polarized). If a second base is controlled besides the first base, all superposition states and, hence, also the third base are fully defined. It is no longer necessary to control this third base as well. It should be mentioned that it is known per se from Cheng-Zhi Peng, Jun Zhang, Dong Yang, Wei-Bo Gao, Huai-Xin Ma, Hao Yin, He-Ping Zeng, Tao Yang, Xiang-Bin Wang and Jian-Wei Pan, "Experimental Long-Distance Decoy-State Quantum Key Distribution Based on Polarization Encoding", Phys. Rev. Lett. 98, 010505 (2007) to use two attenuated laser diodes for two bases integrated in the system. The used single photons, however, involve a long communication time in the order of minutes and, therefore, cannot be used for the readjustment of typical polarization drifts (to be clearly recognized from FIG. 2).

Every possible polarization state can be unambiguously represented by said three independent bases, since it is possible to compose every polarization to be analyzed of the polarizations of a base (so-called eigenstates). Horizontal polarization is, for instance, produced if identical +45°- and −45°-polarized radiations are superposed. If the radiated polarization is chosen exactly in the direction of the bases (so-called base eigenstate), the respective analyzer will pass on the whole power into an arm. If, for instance, horizontal polarization is analyzed in the (H,V)-base, the H-detector will indicate a maximum and the V-detector will be in the minimum. However, if an eigenstate of another base falls on the analyzer, the radiation will be evenly distributed. Horizontal polarization produces identical starting values amounting to exactly half of the maximum value both in the (+,−)-base and in the (L,R)-base. A polariometer is used to analyze an unknown incident radiation in all three bases. In doing so, every possible, pure polarization state is unambiguously determined.

Even with an initially well equipped overall transmission system (with the total polarization drift of the fiber being compensated), temperature changes and vibrations will cause a time-dependent deviation of the polarization, which will have to be tracked. If the glass fiber runs aerially over long distances, changes typically occurring as slow drifts will result from similar temperature changes of the day/night cycle. If fiber paths extend on bridges, a plurality of differently slow and rapid effects may couple onto the fiber. The technically most challenging application comprises overhead lines on e.g. high-tension line poles, since uncoordinated pendulum movements caused by wind may lead to strong deviations from the initial state. Because of the most diverse applications, it is suitable to separate the transmission path from the remaining quantum array and introduce separate readjustment. In doing so, it is of particular importance to realize the required timings so rapidly that the readjustment will react more rapidly than the typical time constants of the interference will influence the deviation from the desired polarization.

An important issue in the configuration of a polarization control is that the influence by the control loop on the individual photons as useful signals be as little negative as possible. A completely independent operation would be desirable. The solution to route a channel with another wavelength over the same fiber involves the drawback that the dependencies of the polarization drift of the two wavelengths differ too strongly when using the telecommunication standard CWDM ("coarse wavelength division multiplexing"). The wavelength raster of 20 nm used in that case is too coarse. An option would be the use of closely adjacent wavelengths that would be available in DWDM ("dense wavelength division multiplexing"). Even then it will not be guaranteed, due to a slightly different dependency of the control element, that the readjustment signal and the quantum signal do have the same polarities. The invention is, therefore, based on that the readjustment signal is to have the same wavelength as the useful signal.

SUMMARY OF THE INVENTION

It is, thus, the object of the invention to provide a method and a device for the readjustment control of a polarization drift as outlined in the beginning, whereby it is feasible to correct a polarization drift within short times, i.e. in seconds or fractures of seconds, while, moreover, avoiding adverse effects on the useful signal, i.e. the polarization-encoded optical signal to be transmitted, and wherein, in particular, also an applicability in quantum communication is provided.

To solve this object, the invention provides a method for readjusting a polarization drift in the transmission of a polarization-encoded optical signal from a transmitter via a light guide to a receiver, wherein, on the side of the transmitter, optical auxiliary signals having the same wavelength as the polarization-encoded optical signal as well as different polarizations, as in correspondence with a first base and a second base, are fed into the light guide while the transmission of the polarization-encoded optical signal is interrupted, and wherein, on the side of the receiver, the optical auxiliary signals are picked up from the light guide and checked for shifts of the different polarizations by a polariometer, whereupon, in the event of the detection of polarization shifts, the different polarizations shifted during the transmission are displaced in the sense of polarization set values via a polarization controller associated with the light guide.

According to a further aspect, the invention provides a device for the readjustment of a polarization drift in the transmission of a polarization-encoded optical signal from a transmitter via a light guide to a receiver, wherein, on the side of the transmitter, a separate signal generator is provided for generating optical auxiliary signals having the same wavelength as the polarization-encoded signal to be transmitted as well as different polarizations, as in correspondence with a first base and a second base, said separate signal generator being connectable with the light guide via an optical switch, said optical switch alternatively applying to the light guide the polarization-encoded optical signal or the optical auxiliary signals, and wherein, on the side of the receiver, an optical switch or coupler is provided for outcoupling the optical auxiliary signals and feeding them to a control loop including a polariometer detecting the actual polarizations of the auxiliary signals, an evaluation and control unit connected with the former and a polarization controller controlled by the latter and associated with the light guide.

In order to unite the individual photons and the control signal (in the following also referred to as optical auxiliary signal), which have both the same wavelength, an optical switch is provided in the present technology. Thereby, the readjustment signal is applied to the channel to be readjusted at the transmitter alternatively to the quantum signal. During polarization control, the connection of the quanta or, generally, of the useful signal is thus interrupted. The electronics performing the polarization readjustment and actuating the optical switch is also able to put out of operation the receiver (s) of the photons on the side of the transmitter, or at least advise also the electronics at the transmitter that no signal pulses need be generated at that time for the detector for detection on the side of the receiver. At the receiver, the useful signal is ideally likewise separated from the control signal by an optical switch, or a coupler may be employed, which allows the useful signal and the control signal to pass for the major part (e.g. 95%) (good for the useful signal), yet conveys a fracture of the potentially present control signal (e.g. 5%) to the evaluation optics (polariometer) in the control loop.

The transmitter part, for instance, comprises two laser diodes having different polarizations. The preferred choice in this respect are horizontal (H) and +45°-oriented polarizations. It is important to select two polarizations which are not both eigenstates of a single base: the values H and V would not be a suitable choice for readjustment. The control of the two laser diodes is assumed by a suitable control electronics also controlling the switch. A separate signaling line connects this electronics with the electronics of the receiver part to analyze the timing.

The receiver part, on the one hand, receives the optical signal of the transmitter, whose initially known polarization has been strongly changed by the transmission, but also runs through a polarization controller, preferably a piezoelectric polarization controller (cf., e.g., http://www.generalphotonics.com/PCD-MO2.htm). Different piezo elements exert pressure on the fiber, thus changing the state of polarization. The control loop of the receiver part will then try to restore the desired state by applying the correct voltages to the piezo elements ("piezos"). In doing so, the polariometer (cf., e.g., http://www.generalphotonics.com/PolaDetect.htm#data) analyzes the incoming polarization in all eigenstates of the three bases (H,V), (+,−) and (L,R). The electronics on the receiver side receives information from the transmitter part on what polarization has been sent and follows the timing of the applied signals in order to find the optimum control voltages.

In the following, the invention will be explained in more detail by way of preferred exemplary embodiments, to which it is however not to be restricted, and with reference to the drawing. Therein:

DESCRIPTION OF ILLUSTRATIVE EMBODIMENTS

Figure 1:
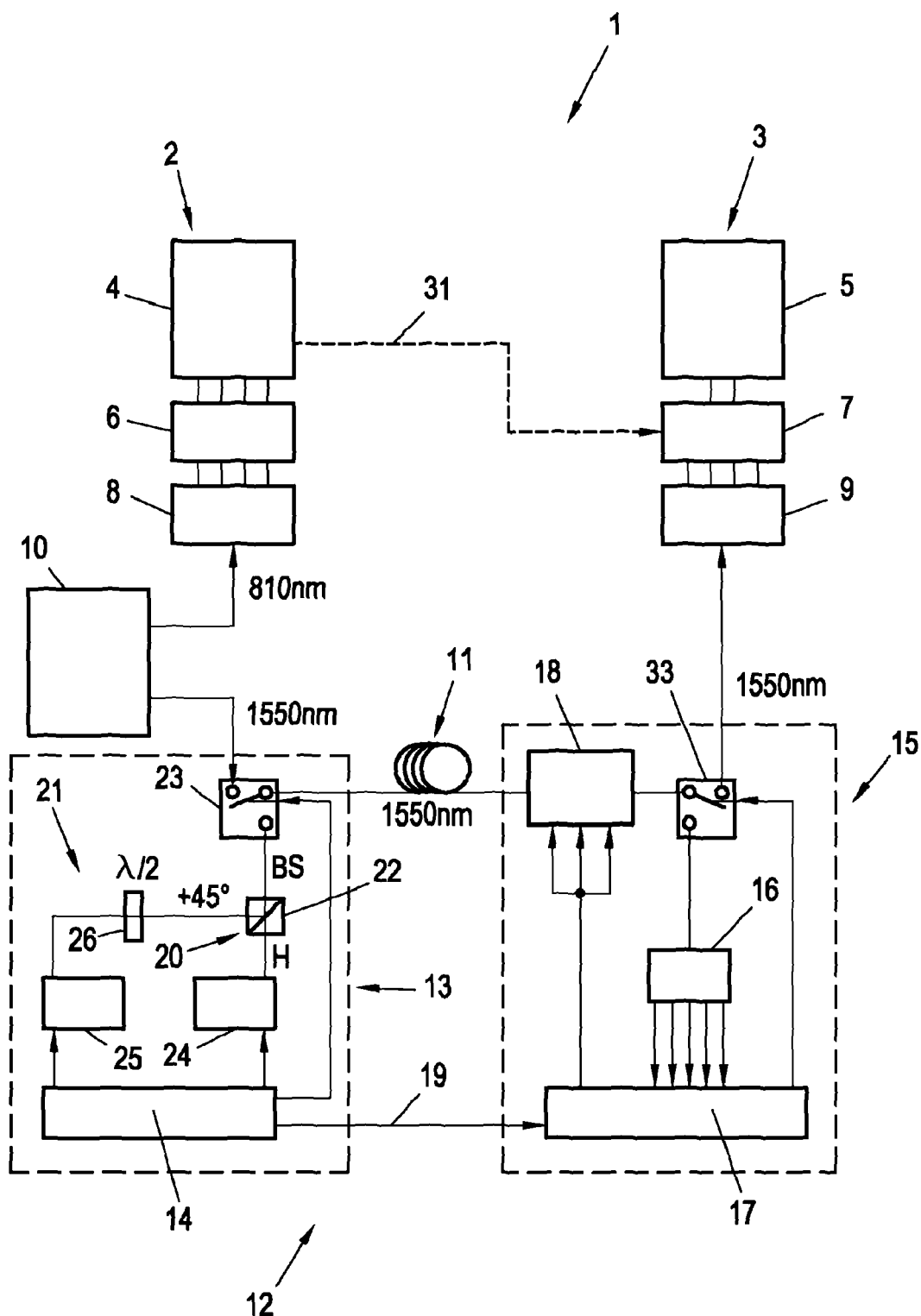
FIG. 1 is a block diagram of a quantum communication device including the control device according to the invention.
Figure 2:
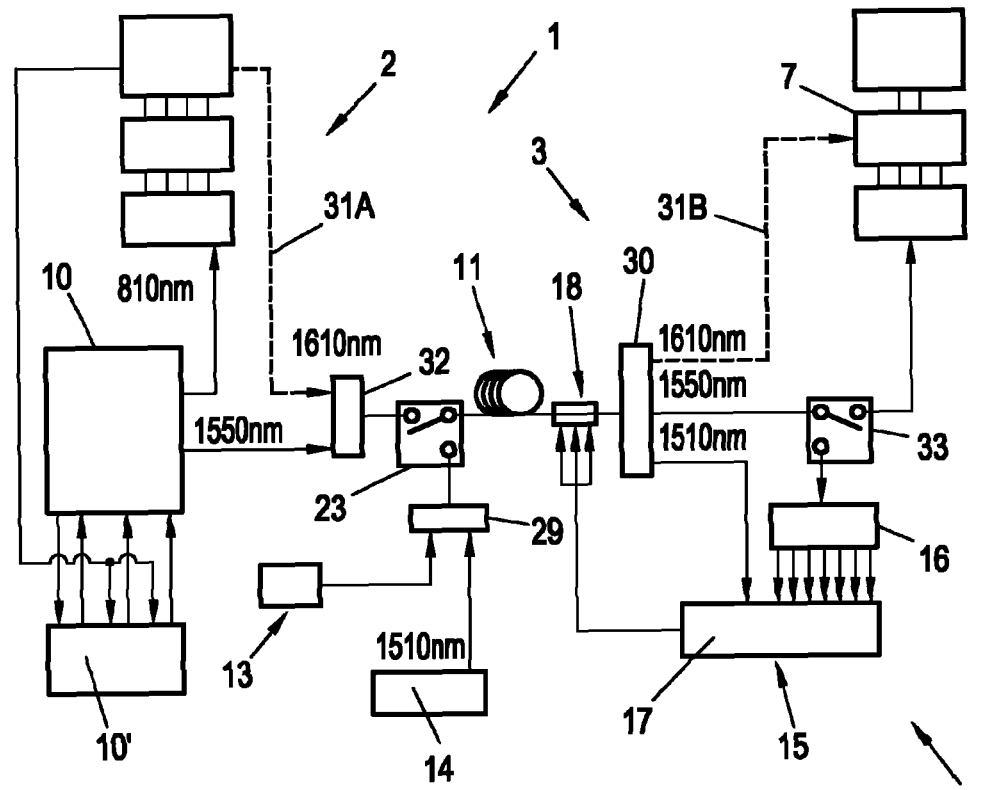
FIG. 2, in a comparable manner, depicts such a communication system including a device for polarization readjustment in a slightly modified form.

In FIG. 1, a quantum communication system 1 including a transmitter 2 (in the literature, generally called "Alice") and a receiver 3 (generally called "Bob") is illustrated. The communication devices proper, such as a computer 4 or 5, an 810 nm detector 6 or 1550 nm detector 7 as well as a BB84 protocol module 8 or 9, respectively, are conventional per se and need not be explained any further just as the photon source 10 (including the control electronics 10', cf. FIG. 2) on the side of the transmitter to produce photons interconnected in a conventional manner.

Furthermore, a quantum channel 11 comprised of a light guide (optical waveguide) or optical fiber cable and, in the following, briefly referred to as light guide 11 is depicted between the transmitter 2 and the receiver 3.

This communication system 1 is associated with a device 12 for polarization drift readjustment, which, on the side of the transmitter, comprises a signal generator 13 for generating optical auxiliary signals as control signals plus its associated control electronics 14. On the side of the receiver, a control loop 15 including a polariometer 16 for detecting the polarities of the control signals transmitted via the channel or light guide 11, an evaluation and control unit 17 as well as a piezoelectric polarization controller 18 are provided.

Between the two electronics units 14, 17, a connection 19 is provided in the form of a synchronization channel for the temporal coordination of the procedures during automatic control.

On the side of the transmitter, optical signals having different polarities, e.g. H (horizontal) and +45° (diagonal), are produced in two signal paths 20, 21 and united in a beam splitter 22 and, in the event of readjustment, are fed into the light guide 11 via an optical switch 23. This optical switch 23 feeds either the useful signal of the photon source 10 (having a wavelength of 1550 nm) or the two control signals having the different polarizations H, +45° into the quantum channel or light guide 11. The control signals have the same wavelength (1550 nm in the illustrated example) as the useful signal. In terms of time, the feeding of the useful signals may take place during 99%, and that of the control signals during 1%, of the time.

Figure 3:
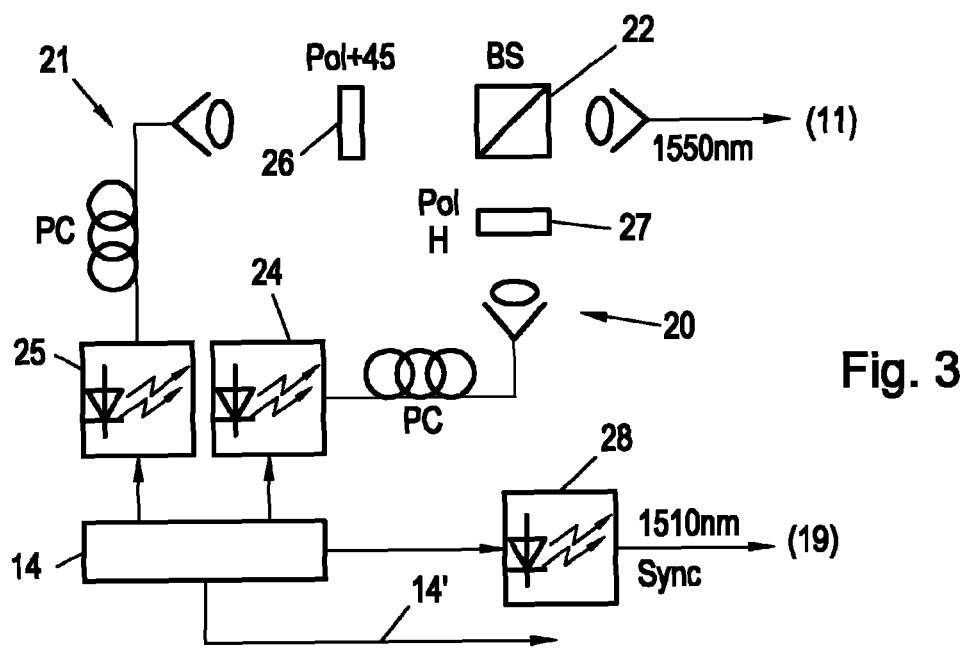
FIG. 3 illustrates a diagram of a signal generator used on the transmitter side for the production of control signals.

In detail, the two control signals are, for instance, produced by two separate laser sources 24, 25, which, in the embodiment according to FIG. 3, are comprised of laser diodes. FIG. 1, furthermore, depicts a λ/2 plate 26 as a polarization rotator to achieve the +45° polarization. An H-polarizer 27 is schematically illustrated in FIG. 3 in the other signal path 20, yet this may be omitted if the laser diode 24 generates a corresponding, horizontally polarized radiation.

For synchronization or time control and triggering, a further laser diode 28 generating radiation of a different wavelength (e.g. 1510 nm) is connected with the control electronics 14. According to the alternative of FIG. 2, this radiation with the different wavelength may also be supplied via a multiplexer 29 to the optical switch 23 for feeding, along with the control signals of the signal generator 13. As is apparent from FIG. 2, a suitable demultiplexer 30 is accordingly provided on the side of the receiver 3 to separate the different wavelengths and supply them to the respective components (e.g. the control or gate pulses, cf. line 31A, 31B, at a wavelength of 1610 nm to the detector 7). These gate pulses or signal pulses for detection may, however, also be transmitted via a separate line 31, as is apparent from FIG. 1. In order to optionally feed the gate pulses into the light guide transmission path 11, a further multiplexer 32 is provided on the side of the transmitter as in correspondence with FIG. 2.

Furthermore, an optical switch or coupler 33 is provided on the side of the receiver to couple the control signals out of the signal path and feed them to the control loop 15. As in contrast to the transmitter side, it is not necessary here to alternatively establish a connection either to the receiver proper or to the control loop 15, for which reason one coupler will do, which, for instance, supplies a major portion (90% or 95%) of the signal to the receiver 3 proper with the detector 7, whereas a smaller portion, for instance 10% or 5%, is fed to the control loop 15.

This control loop 15 will always be activated by synchronization signals from the control electronics 14 on the side of the transmitter, if control signals are generated and sent for the purpose of polarization drift readjustment. The switches or couplers 23, 33 will then also be activated in a corresponding manner.

In FIG. 3, furthermore, an output 14' of the electronics 14 is shown as switch output and time tagging output.

Instead of producing control signals with a horizontal polarization and a +45° polarization as described, it would, of course, also be conceivable to provide a vertical polarization (V) and/or a −45° polarization. The only thing important is that a first base (e.g. horizontal or vertical) and a second base (+45° or −45°, or left or right) be present.

Figure 4:
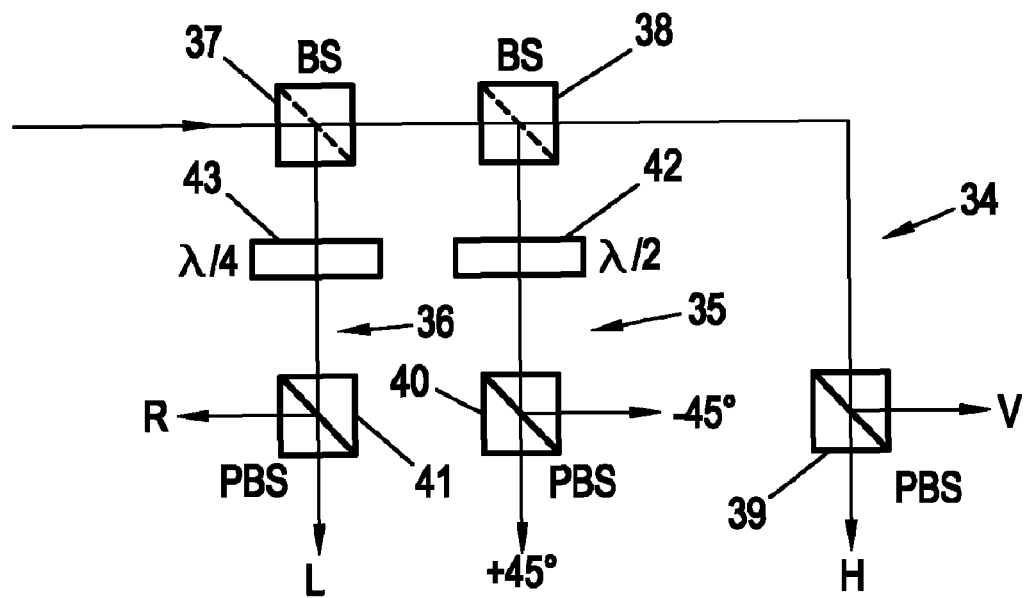
FIG. 4 schematically illustrates the structure of a polariometer used within the control loop on the receiver side.

FIG. 4 schematically illustrates an exemplified structure of a polariometer 16. The unknown incident polarization is analyzed in three different bases corresponding to three signal paths 34, 35, 36, which are obtained by providing two beam splitters 37, 38. As is apparent from FIG. 4, three further beam splitters 39, 40, 41 are provided in the three signal paths 34, 35, 36, and, furthermore, a λ/2 plate is arranged in the signal path 35 and a λ/4 plate is arranged in the signal path 36. Correspondingly, the (H,V) base is measured without a wave plate, whereas the λ/2 plate is provided for the (+,−) base and the λ/4 plate 36 is provided for the (L,R) base. In this manner, the respective portions, H/V, +45°/−45° and L,R are detected.

During operation, after the electronics 14 of the transmitter part 2 has decided on the initiation time, a horizontal H-polarization is, at first, generated, the optical switch 23 is thrown, and this is also signalized to the receiver part 3. The receiver part 3 analyzes the effective polarization state (actual polarization) with the values adjusted at the piezos of the controller 18 during the last passage. Subsequently, also the polarizations measured by a deliberately caused shift are analyzed. The measured polarizations form a pattern on a Poincare ball, cf. FIG. 5, with a center M (original measurement) surrounded by six values corresponding to the slightly changed voltages at the piezos. The transmitter 2 is programmed to switch the laser diodes 24, 25, and activate the other, +45°-polarized laser diode 25, after a defined time. The same procedure with identical voltage values at the piezos will detect a similar pattern circling around the original value of the piezo controller 18 measured by the +45° polarization. According to this measuring procedure, reswitching to quantum communication is effected, with the electronics 17 on the receiver side starting evaluation.

Figure 5:
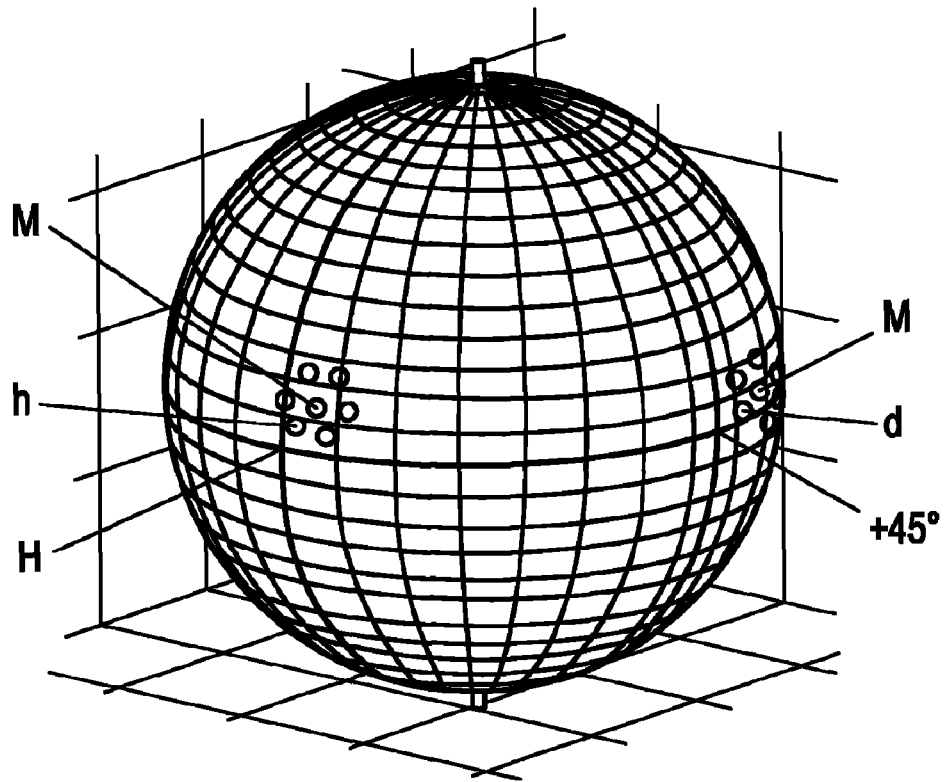
FIG. 5 is an elevational view of a Poincare ball to illustrate the mode of procedure followed in the present polarization drift readjustment.

In order to determine the optimum value, all seven possible positions of the piezo controller 18 are analyzed each time, and from the values the voltage that comes next to the target point (H; +45°) is determined. For the H- and 45°-polarized laser diodes 24, 25, the optimum useful deviation from the two measured points and the target point is thus each determined: The values coming next to the target "H" and "+45°" (FIG. 5) (set polarization), cf. points "h" and "d" in FIG. 5, are used to calculate the new voltage values. The steps involved depend on the attainable speeds and on the noise occurring in the detectors and have to be adapted to the respective conditions in order to achieve an optimally rapid readjustment. The time of the control required for practical use is in the order of seconds or tenths of seconds as opposed to the slow controls provided by the prior art. In this respect, it is important that the invention realizes the readjustment with a specially incoupled, classic light rather than with quanta, so that the necessary electronic messages will be performed within the shortest time (fractions of seconds), whereas message times in the order of minutes would be required when using the useful radiation itself for controlling.

The following is a summarization of specific features of the present control:

Introduction of a second base

Identical wavelength for control signal and signal

Optical switch at transmitter for switching between useful and control signals

Only short-time interruptions of quantum signal

The present control compensates for the total polarization rotation and fixes all polarizations. If only one base were used (as in commercially available devices), only one axis (H) would be controlled by the control on the Poincare ball, while the other axes would run free and receive undesired drifts.

In order to obtain the short control times required, it is also important that the control is effected with separately produced and incoupled light rather than with quanta.

The invention claimed is:

1. A method for readjusting a polarization drift in the transmission of a polarization-encoded optical signal from a transmitter via a light guide to a receiver, wherein, on the side of the transmitter, optical auxiliary signals having the same wavelength as the polarization-encoded optical signal as well as different polarizations, corresponding to a first base and a second base, are fed into the light guide while the transmission of the polarization-encoded optical signal is interrupted, and wherein, on the side of the receiver, the optical auxiliary signals are picked up from the light guide and checked for shifts of the different polarizations by a polariometer, whereupon, in the event of the detection of polarization shifts, the different polarizations shifted during the transmission are displaced in the sense of polarization set values via a polarization controller associated with the light guide.

2. The method according to claim 1, wherein, on the side of the transmitter, two auxiliary signals, one with a horizontal or vertical polarization and one with a 45° polarization, are fed into the light guide.

3. The method according to claim 1, wherein the optical auxiliary signals are produced by the aid of two laser diodes.

4. The method according to claim 1, wherein the different polarizations of the optical auxiliary signals are adjusted by the aid of different polarizers arranged in signal paths.

5. The method according to claim 1, wherein, on the side of the receiver, predefined polarization deviations in various directions relative to the respectively detected set polarizations are introduced by the aid of the polarization controller, and readjustments of the polarizations are each based on the deviation that best establishes the respective polarization set value.

6. The method according to any one of claims 1 to 5, wherein, on the side of the transmitter, associated control signals for the temporal coordination of the readjustment on the side of the receiver are generated and transmitted to the receiver.

7. The method according to claim 6, wherein the control signals are generated as optical signals having a wavelength differing from that of the optical auxiliary signals and are likewise transmitted to the receiver via the light guide.

8. The method according to claim 7, wherein the optical auxiliary signals have a wavelength of 1550 nm and the control signals have a wavelength of 1510 nm.

9. The method according to claim 7, wherein the optical auxiliary signals and the control signals are fed into the light guide via a multiplexer.

10. The method according to any one of claims 1 to 5, wherein it is applied in quantum communication.

11. The method according to claim 6, wherein it is applied in quantum communication.

12. A device for the readjustment of a polarization drift in the transmission of a polarization-encoded optical signal from a transmitter via a light guide to a receiver, wherein, on the side of the transmitter, a separate signal generator is provided for generating optical auxiliary signals having the same wavelength as the polarization-encoded signal to be transmitted as well as different polarizations, corresponding to a first base and a second base, said separate signal generator being connectable with the light guide via an optical switch, said optical switch alternatively applying to the light guide the polarization-encoded optical signal or the optical auxiliary signals, and wherein, on the side of the receiver, an optical switch or coupler is provided for outcoupling the optical auxiliary signals and feeding them to a control loop including a polariometer detecting the actual polarizations of the auxiliary signals, an evaluation and control unit connected with the former and a polarization controller controlled by the latter and associated with the light guide.

13. The device according to claim 12, wherein the signal generator comprises at least two optical signal paths in which different polarizers are arranged.

14. The device according to claim 13, wherein the two signal paths are united in a beam splitter.

15. The device according to claim 13, wherein each signal path has its own laser diode.

16. The device according to claim 12, wherein the polarization controller is a piezoelectric polarization controller.

17. The device according to claim 12, wherein the evaluation and control unit is arranged to control the polarization controller for the production of predefined polarization deviations in various directions relative to the respectively detected actual polarizations and to each take as a basis for the readjustment of the polarizations the deviation that best establishes the respective polarization set value.

18. The device according to any one of claims 12 to 17, wherein a control-signal producing control circuit is arranged on the side of the transmitter for the control of the signal generator and optical switch as well as for the temporal coordination of the readjustment on the side of the receiver.

19. The device according to claim 18, wherein the control signals are generated as optical signals having a wavelength differing from that of the optical auxiliary signals and are likewise transmitted to the receiver via the light guide.

20. The device according to claim 18, wherein the optical auxiliary signals and the control signals are fed into the light guide via a multiplexer.

* * * * *